United States Patent
Yeh et al.

(10) Patent No.: US 8,633,840 B2
(45) Date of Patent: Jan. 21, 2014

(54) SEQUENCE TRANSITION POINT DETERMINING METHOD AND APPARATUS THEREOF

(75) Inventors: Po Lin Yeh, Hsinchu Hsien (TW);
Chien-Hsing Lin, Hsinchu Hsien (TW);
Jui-Hua Yeh, Hsinchu Hsien (TW);
Shao Ping Hung, Hsinchu Hsien (TW);
Chih-Tien Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 556 days.

(21) Appl. No.: 12/946,968

(22) Filed: Nov. 16, 2010

(65) Prior Publication Data

US 2011/0188600 A1 Aug. 4, 2011

Related U.S. Application Data

(60) Provisional application No. 61/300,014, filed on Jan. 31, 2010.

(51) Int. Cl.
*H03M 13/00* (2006.01)

(52) U.S. Cl.
USPC ............... 341/94; 369/19; 375/240; 375/295; 375/376; 375/362; 345/531; 345/649; 324/98

(58) Field of Classification Search
USPC ......... 341/90–98; 369/47.19, 59.25; 375/376, 375/240.12, 295, 362, 130, 132; 435/69.1; 345/531, 649; 455/3.02; 324/98, 324/207.25
See application file for complete search history.

(56) References Cited

U.S. PATENT DOCUMENTS

| | | | | |
|---|---|---|---|---|
| 6,046,574 A * | 4/2000 | Baranowski et al. | .......... | 320/132 |
| 6,956,587 B1 * | 10/2005 | Anson | ........................... | 345/649 |
| 7,133,349 B2 * | 11/2006 | Nagai et al. | ................ | 369/59.25 |
| 7,164,644 B2 * | 1/2007 | Nagai et al. | ................ | 369/59.25 |
| 7,489,249 B2 * | 2/2009 | Better et al. | ................ | 340/573.1 |
| 7,760,840 B2 * | 7/2010 | Chang | ........................... | 375/376 |
| 8,311,075 B2 * | 11/2012 | Leiby et al. | ................... | 375/132 |

* cited by examiner

*Primary Examiner* — Lam T Mai
(74) *Attorney, Agent, or Firm* — Edell, Shapiro & Finnan, LLC

(57) ABSTRACT

A determining method and apparatus thereof for a transition point of a sequence which can be applied to a decoder. The determining method determines the transition point of the sequence having N numbers, wherein the sequence is composed of a first value and a second value and N is a positive integer. The determining method includes determining the position the first value appearing consecutively in the sequence to determine a first interval; determining the position the second value appearing consecutively in the sequence to determine a second interval; and determining the longer interval between the first interval and the second interval, when the first interval is longer, determining an adjacency of the first interval and the second value as the transition point according to the first interval, and when the second interval is longer, determining an adjacency of the second interval and the first value as the transition point.

19 Claims, 3 Drawing Sheets

SEQUENCE TRANSITION POINT DETERMINING METHOD AND APPARATUS THEREOF

CROSS REFERENCE TO RELATED PATENT APPLICATION

This patent application claims the benefit of U.S. provisional patent application No. 61/300,014 filed on Jan. 31, 2010.

FIELD OF THE INVENTION

The present invention relates to a determining method and apparatus thereof, and more particularly to a sequence transition point determining method and apparatus thereof.

BACKGROUND OF THE INVENTION

There are various kinds of digital signal coding methods in the prior art. One of those digital signal coding methods is to represent different values with a sequence having N numbers. The sequence comprises consecutive N/2 0's and consecutive N/2 1's. A boundary between 0 and 1 can represent different values.

However, due to hardware imperfections or noise interference in transmission, some values of the sequence having N numbers may be changed in transmission, and it is difficult to expect which positions of the sequence are unintentionally changed. That is, although a decoder generates consecutive N/2 0's and consecutive N/2 1's, the sequence inputted in the decoder is not necessarily the original sequence having consecutive N/2 0's and consecutive N/2 1's.

For example, supposing the original transmitting sequence having 20 numbers is [0 0 0 0 1 1 1 1 1 1 1 1 1 1 0 0 0 0 0 0], i.e., N=20, a transition point of the sequence from 1 transiting to 0 is 14. Nevertheless, due to hardware imperfection or noise interference in transmission, the sequence inputted to the decoder might be [1 1 0 0 1 1 1 1 1 0 0 1 1 0 0 1 1 0 0 0]. If so, since the transition points of the sequence from 1 transiting to 0 are not unique, one needs to determine one transition point within N positions.

The conventional sequence transition point determining method is to use a lookup table. The lookup table method is time costly and wastes hardware resources since the table with $2^N$ kinds of 1's and 0's combination should be stored in advance, and the transition point for each kind of combination needs to be manually determined respectively. Also, when N is changed, the table must likewise be reconstructed, which is costly.

Therefore, there is a desire for a sequence transition point determining method and apparatus thereof.

SUMMARY OF THE INVENTION

It is one of the objectives of the present invention to provide a sequence transition point determining method and apparatus thereof.

The invention provides a determining method, for determining a transition point of a sequence having N numbers, wherein the sequence is composed of a first value and a second value and N is a positive integer, the determining method comprising: determining positions of the first value appearing consecutively in the sequence to determine a first interval; determining positions of the second value appearing consecutively in the sequence to determine a second interval; and determining the longer interval between the first interval and the second interval, when the first interval is longer, determining an adjacency of the first interval and the second value as the transition point, and when the second interval is longer, determining an adjacency of the second interval and the first value as the transition point.

The invention further provides a determining apparatus, for determining a transition point of a sequence having N numbers, wherein the sequence is composed of a first value and a second value and N is a positive integer, the determining apparatus comprising: an interval determining unit, for determining positions of the first value appearing consecutively in the sequence to determine a first interval and for determining positions of the second value appearing consecutively in the sequence to determine a second interval; and a position determining unit, for determining the longer interval between the first interval and the second interval, and when the first interval is longer, determining an adjacency of the first interval and the second value as the transition point, and when the second interval is longer, determining an adjacency of the second interval and the first value as the transition point.

The invention provides the sequence transition point determining method and apparatus thereof, which can be applied to a decoder. By the invention, even though the sequence has errors occurring due to external reasons, i.e., process or temperature, the transition point of the sequence can also be correctly recovered.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Due to external influences, values of some positions in a sequence may be changed. Supposing the sequence is transmitted with consecutive N/2 number of 0's and consecutive N/2 number of 1's, due to variation of some values, it is difficult to determine a correct transition points for 0 and 1 alternations in the sequence. The present invention provides a sequence transition point determining method and apparatus thereof for determining the transition point from 1 transiting to 0 or 0 transiting to 1 by interval(s) with more consecutive 0's or 1's in numbers.

The invention determines the interval with most consecutive 0's in numbers by positions for consecutive 0's in the input sequence and determines the interval with more consecutive 1's in numbers by positions for consecutive 1's in the input sequence. Then, the transition point is determined according to the longest interval between the above 0's and 1's intervals. When the longest interval is one of the 0's intervals, it is determined that an adjacency of the 0's interval and 1 is the transition point, and when longest interval is one of the 1's intervals, it is determined that an adjacency of the 1's interval and 0 is the transition point.

Figure 1:
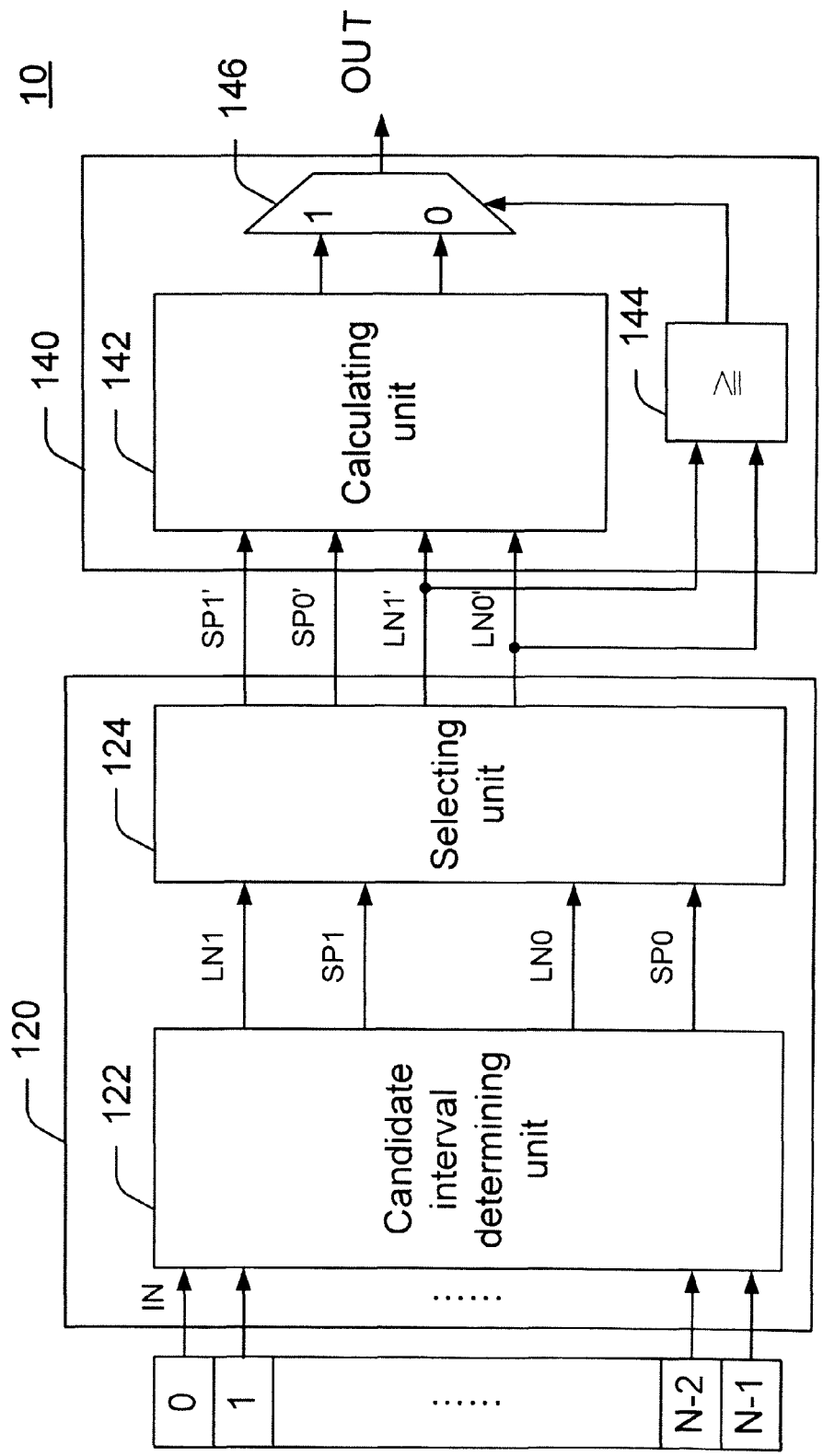
FIG. 1 is a block diagram of a sequence transition point determining apparatus according to one embodiment of the invention.

FIG. 1 is a block diagram of a sequence transition point determining apparatus according to one embodiment of the invention. The determining apparatus 10 comprises an interval determining unit 120 and a position determining unit 140. The interval determining unit 120 comprises a candidate interval determining unit 122 and a selecting unit 124. The position determining unit 140 comprises a calculating unit 142, a comparator 144 and a selector 146.

The candidate interval determining unit 122 detects every interval having consecutive 0's in a sequence IN for determining a plurality of candidate intervals having consecutive 0's, and detects every interval appearing consecutive 1's in the sequence IN for determining a plurality of candidate intervals appearing consecutive 1's, and information of candidate intervals is outputted to the selecting unit 124. The information of each candidate interval represents the position and the length of the candidate interval, such as the position of right boundary, a left boundary or the length of the candidate interval, or any other information that can define an interval. The following example takes the left boundary SP1 and length LN1 of the 1's candidate interval, the left boundary SP0 and the length LN0 of the 0's candidate interval to define the interval.

The candidate interval determining unit 122 can calculate the length of the candidate interval in a cyclical manner. That is to say, when the most left interval and the most right interval of the sequence IN both are in the same digit (e.g., both are in 0 or both are in 1), they can be viewed as the same interval. For example, supposing N=18, and the sequence IN is [0 0 0 1 1 1 1 1 1 1 1 0 0 0 0 0 0], ideally the length LN1 of the 1's candidate interval is 9, and because of the cyclical calculation, the length LN0 of the 0's candidate interval is seen as 9 rather than 3 or 6 respectively. The left boundary of the 1's candidate interval is at the position 13, and the right boundary is at the position 3.

However, due to hardware imperfection or noise interference in transmission, the sequence IN, inputted to the candidate interval determining unit 122, might actually be [0 0 0 1 1 1 1 1 1 1 1 1 0 0 1 1 0 0]. With implementation of the present the invention, in this case, the transition point from 1 transiting to 0 can be correctly determined.

In the embodiment, supposing the transition point of the sequence IN from 1 transiting to 0 is determined, the candidate interval determining unit 122 outputs the left boundaries SP1={4, 15} of the 1's candidate intervals, the corresponding lengths LN1={9, 2}, the right boundaries SP0={3, 14} of the 0's candidate intervals and the corresponding lengths LN0={5, 2}. Here, the left boundaries SP1={4, 15} represent two consecutive 1's intervals with the left boundaries at the fourth and the fifteenth position respectively, and the lengths LN1={9, 2} represent that the length of the first consecutive 1's interval is 9 and the length of the second consecutive 1's interval is 2. Similarly, SP0 and LN0 of the 0's candidate intervals have the same definition.

The selecting unit 124 selects the longer one of the 0's and 1's candidate intervals respectively and outputs the left boundary SP1'=4 of the longer 1's interval and the corresponding length LN1'=9, and the right boundary SP0'=3 of the longer 0's interval and the corresponding length LN0'=5.

Similarly, suppose that the transition point of the sequence IN from 0 transiting to 1 is to be determined, the candidate interval determining unit 122 outputs the right boundaries SP1={12, 16} of the 1's candidate intervals, the corresponding lengths LN1={9, 2}, the left boundaries SP0={13, 17} of the 0's candidate intervals and the corresponding lengths LN0={5, 2}. The selecting unit 124 selects the longer one of the 0's and 1's candidate intervals respectively and outputs the right boundary SP1'=12 of the longer one of 1's intervals and the corresponding length LN1'=9, and the left boundary SP0'=17 of the longer one of 0's intervals and the corresponding length LN0'=5.

As an example, the transition point of the sequence IN from 1 transiting to 0 is explained next. The calculating unit 142 calculates two boundaries respectively according to the left boundary SP1'=4 and the corresponding length LN1'=9 of the longer one of 1's intervals, the right boundary SP0'=3 and the corresponding length LN0'=5 of the longer one of 0's intervals. For example, to calculate the transition point via the longer consecutive 1's interval is to add the left boundary SP1'=4 to the corresponding length LN1'=9, then subtract by 1, and take modulus by N=18 (mod N), and one can obtain the boundary is 12. To calculate the transition point via the longer consecutive 0's interval is to subtract the right boundary SP0'=3 by the corresponding length LN0'=5 and then to take modulus by N=18, and one can obtain the boundary is 16. Since the length is obtained cyclically, when the transition point is calculated, one needs to take modulus for obtaining the correct result.

Similarly, supposing the transition point of the sequence IN from 0 transiting to 1 is to be determined, then the method of obtaining the transition point from the longer consecutive 0's interval is to add the left boundary SP0'=17 to the corresponding length LN0'=5, then subtract by 1 and take modulus by N, and one can obtain the boundary is 3. To calculate the transition point from the longer consecutive 1's interval is to subtract the right boundary SP1'=12 by the corresponding length LN1'=9, and then take modulus by N, and one can obtain the boundary is 3.

Still with respect to the transition point of the sequence IN from 1 transiting to 0, the comparator 144 compares the length LN1'=9 of the 1's interval and the length LN0'=5 of the 0's interval and outputs a comparison result to the selector 146. The selector 146 selects the boundary of the longer interval between the 0's and 1's intervals as the transition point OUT. In this embodiment, since LN1'>LN0', the selector 146 outputs the boundary, calculated according to 1's interval, as the transition point OUT=12 from 1 transiting to 0 of the sequence IN.

Similarly, supposing the transition point of the sequence IN to be determined is the transition point from 0 transiting to 1, the selector 146 outputs the boundary, calculated according to 1's interval, as the transition point OUT=3 of the sequence IN from 0 transiting to 1 since LN1'>LN0'.

It is noted that when the length of the longest interval among the 0's and 1's intervals is less than N/2, the calculating unit 142 can set the length to be N/2 so as to calculate the boundary. For example, supposing the longer interval between the length LN1' and the length LN0' is the length LN1' and LN1'<N/2, the calculating unit 142 can set LN1'=N/2 for calculating the boundary. This is because ideally the sequence having N numbers comprises consecutive N/2 0's and consecutive N/2 1's.

Figure 2:
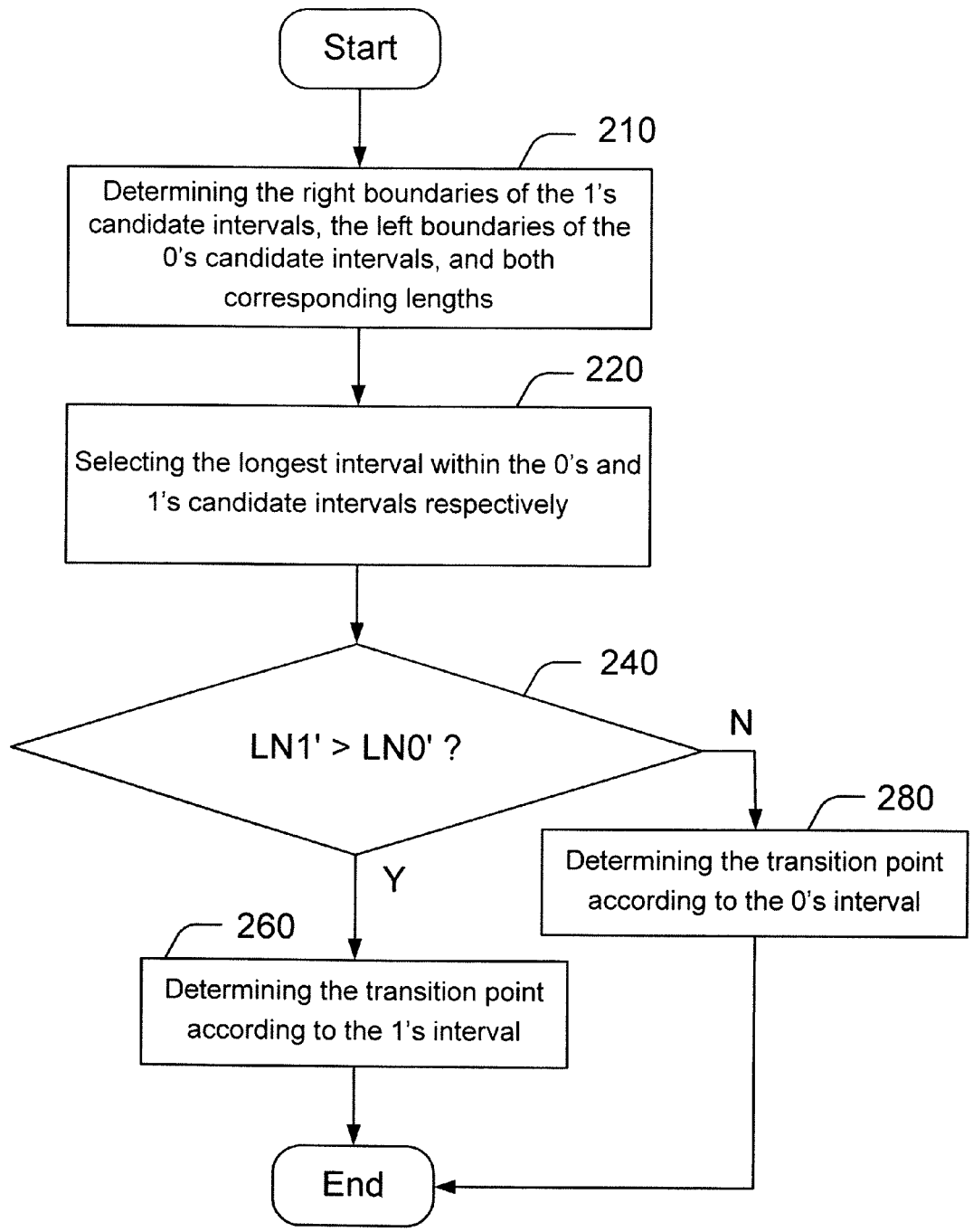
FIG. 2 is a flowchart of a sequence transition point determining method corresponding to one embodiment of the invention.

FIG. 2 is a flowchart of a sequence transition point determining method corresponding to one embodiment of the present invention. Assume that the original sequence is [1 1 1 0 0 0 0 0 0 1 1 1], and the transition point of the sequence from 0 transiting to 1 is at 9. Nevertheless, due to the external influence, some errors occur to the sequence and the sequence is changed to [1 1 1 0 0 1 1 0 0 1 1 1]. By implementing the invention, the transition point can still be correctly determined. Transition point at which from 0 transiting to 1 of the sequence IN is taken for example in the following.

Step 210 includes determining the right boundaries SP1={3, 7} and the corresponding lengths LN1={6, 2} of the 1's candidate intervals, and the left boundaries SP0={4, 8} and the corresponding lengths LN0={2, 2} of the 0's candidate intervals, respectively. Here, the right boundaries SP1={3, 7} represent two consecutive 1's intervals with the right boundaries at the third and the seventh position respectively, and the lengths LN1={6, 2} represent that the length of the first consecutive 1's interval is 6 and the length of the second consecutive 1's interval is 2. Similarly, SP0 and LN0 of the 0's candidate intervals have the same meaning.

Step 220 includes selecting the longest interval within the 0's and 1's candidate intervals respectively is performed. In the embodiment, one determines the right boundary SP1'=3 of the 1's interval, the left boundary SP0'=4 of the 0's interval, the corresponding lengths LN1'=6 and LN0'=2. It is noted that if there exist multiple candidate intervals with the same longest length, e.g., LN0={2, 2}, one can select any one among them.

Step 240 includes determining whether the length LN1' of the 1's interval is greater than the length LN0' of the 0's interval. If yes, Step 260 is performed, and if not, Step 280 is performed. In the embodiment, because LN1'>LN0', Step 260 is proceeded to determine the transition point according to the 1's interval. That is, to calculate the transition point according to the 1's interval is to subtract the right boundary SP1'=3 by the length LN1'=6, and then the result is taken into modulus by N, and the boundary is obtained, i.e., SP1'−LN1' (mod 12)=3−6 (mod 12)=9. In another embodiment, if LN1'<LN0', Step 280 is proceeded by determining the transition point according to the 0's interval. Accordingly, even though errors occur in the sequence, the transition point can be correctly obtained using the sequence transition point determining method of the invention.

Figure 3:
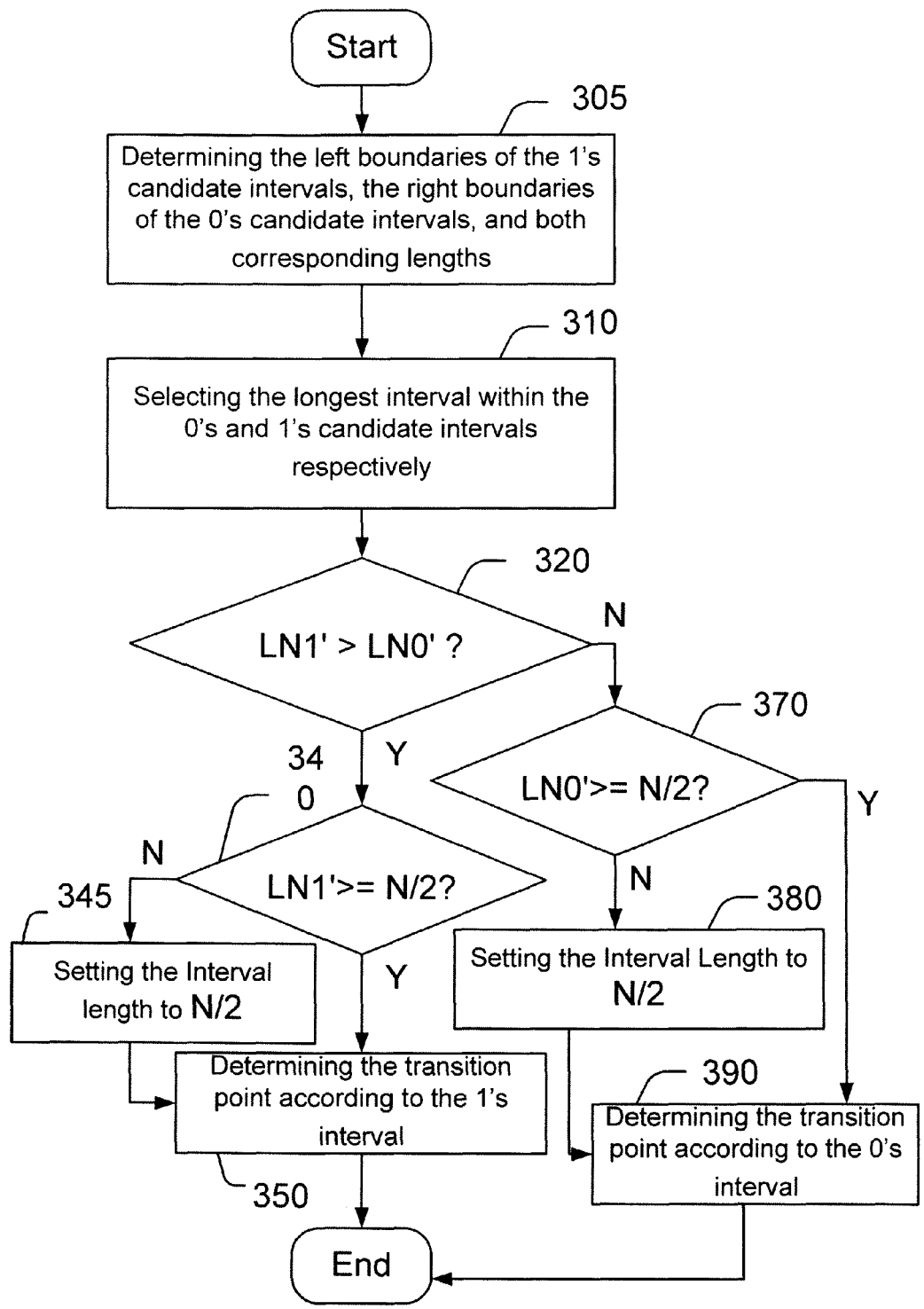
FIG. 3 is a flowchart of a sequence transition point determining method according to another embodiment of the invention.

In another preferable embodiment, the invention can also be applied to a decoder. FIG. 3 is a flowchart of a sequence transition point determining method according to another embodiment of the invention. Assume that an encoder transmits the original sequence having 18 numbers is [0 0 0 1 1 1 1 1 1 1 1 1 0 0 0 0 0 0], and the transition point of the sequence from 1 transiting to 0 is 12. Due to hardware imperfections or the noise interference in transmission, the sequence becomes [0 0 0 1 1 1 1 0 0 1 1 1 0 0 0 1 1 1]. By implementation of the invention, the transition point of the sequence from 1 transiting to 0 can still be correctly determined.

Step 305 includes determining the left boundaries SP1={4, 10, 16} of the 1's candidate intervals, the right boundaries SP0={3, 9, 15} of the 0's candidate intervals, the corresponding lengths LN1={4, 3, 3} and the corresponding lengths LN0={3, 2, 3} respectively. Here, the left boundaries SP1={4, 10, 16} represent three consecutive 1's intervals with the left boundaries at the fourth, the tenth and the sixteenth position respectively, and the lengths LN1={4, 3, 3} represent that the length of the first consecutive 1's interval is 4, the length of the second consecutive 1's interval is 3, and the length of the third consecutive 1's interval is 3. Similarly, SP0 and LN0 of the 0's candidate intervals have the same meaning.

Then, Step 310 includes selecting the longer interval between the 1's and 0's candidate intervals respectively. In the embodiment, one determines the left boundary SP1'=4 of the 1's interval, the right boundary SP0'=3 of the 0's interval, the corresponding lengths LN1'=4 and LN0'=3.

Step 320 includes determining whether the length LN1' of the 1's interval is greater than LN0' of the 0s' interval. If yes, Step 340 is proceeded, and if not, Step 370 is proceeded. In this embodiment, LN1'>LN0', so Step 340 is proceeded. In Step 340, one determines whether the length of 1's interval is greater than N/2=9. If yes, Step 350 is proceeded, and if not, Step 345 is proceeded. In this embodiment, LN1'<N/2, so Step 345 is proceeded, setting the length to N/2=9, i.e., setting LN1' from an original value 4 to value 9, and Step 350 is then proceeded. Step 350 includes determining the transition point according to the 1's interval, which means that the method of calculating the transition point based on the 1's interval is to add the left boundary SP1'=4 to the corresponding length LN1'=9, then subtract the result by 1, and then it is taken into modulus N, i.e., SP1'+LN1'−1 (mod 18)=4+9−1 (mod 18)=12. Step 370 includes determining whether the length of the 0's interval is greater than or equal to N/2. If yes, Step 390 is proceeded, and if not, Step 380 is proceeded. In Step 380, one sets the length of the 0's interval to N/2=9. In Step 390, one determines the transition point according to the 0's interval. From the above description, even though the sequence has errors, the correct transition point can still be obtained by the determining method of the present invention.

From the above, the invention discloses the sequence transition point determining method and apparatus thereof, and the invention can be applied to the decoder. By the invention, even though the sequence has errors due to external influences, e.g., process and temperature, the transition point of the sequence can still be correctly obtained.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of determining a transition point of a sequence having N numbers, the sequence having a first value and a second value and N is a positive integer, the method comprising:
   determining, by an interval determining unit, a first interval by deciding positions at which the first value appears consecutively in the sequence;
   determining, by the interval determining unit, a second interval by deciding positions at which the second value appears consecutively in the sequence;
   determining, by a position determining unit, the transition point according to an adjacency of the first interval and the second value when the first interval is longer than the second interval; and
   determining, by the position determining unit, the transition point according to an adjacency of the second interval and the first value when the second interval is longer than the first interval.

2. The method according to claim 1, wherein the first interval is the longest interval among a plurality of first candidate intervals formed by consecutive first value, and the second interval is the longest interval among a plurality of second candidate intervals formed by consecutive second value.

3. The method according to claim 1, wherein when an interval length of the longer interval of the first interval and the second interval is shorter than N/2, the step of comparing further comprises determining the transition point according to N/2.

4. The method according to claim 3, further comprising setting an interval length of the first interval to be N/2 when the interval length of the first interval is shorter than N/2.

5. The method according to claim 1, wherein determining the first interval comprises determining the first interval in a cyclical manner.

6. The method according to claim 5, wherein a boundary of the first interval is generated by N modulus calculation of another boundary of the first interval and an interval length of the first interval.

7. The method according to claim 1, wherein the transition point is at one of a first position which the first value transits to the second value and a second position which the second value transits to the first value.

8. The method according to claim 1, wherein the step of determining a first interval comprises determining an alternative of a left boundary and a right boundary of the first interval, and the transition point associates with the left boundary and the right boundary of the first interval.

9. The method according to claim 8, wherein the transition point is at the right boundary of the first interval when the transition point is determined according to an adjacency of the first interval and the second value, and the transition point is at a previous position of the left boundary of the first interval when the transition point is determined according to an adjacency of the second interval and the first value.

10. An apparatus for determining a transition point of a sequence having N numbers, the sequence having a first value and a second value and N is a positive integer, the determining apparatus comprising:
   an interval determining unit, for determining a first interval by detecting positions where the first value appears consecutively in the sequence and for determining a second interval by detecting positions where the second value appears consecutively in the sequence; and
   a position determining unit, comparing the first interval and the second interval, wherein the transition point is determined according to an adjacency of the first interval and the second value when the first interval is longer than the second interval, and the transition point is determined according to an adjacency of the second interval and the first value when the second interval is longer than the first interval.

11. The apparatus according to claim 10, wherein the interval determining unit comprises:
   a candidate interval determining unit, for determining a plurality of first candidate intervals formed by consecutive first value, and determining a plurality of second candidate intervals formed by consecutive second value; and
   a selecting unit, for selecting the longest interval within the first candidate intervals as the first interval, and selecting the longest interval within the second candidate intervals as the second interval.

12. The apparatus according to claim 10, wherein when an interval length of the longer interval within the first interval and the second interval is shorter than N/2, the position determining unit determines the transition point further according to N/2.

13. The apparatus according to claim 12, wherein when the interval length of the first interval is shorter than N/2, the interval length of the first interval is set to N/2.

14. The apparatus according to claim 10, wherein the transition point is at a first position where the first value transits to the second value and at a second position where the second value transits to the first value.

15. The apparatus according to claim 14, wherein the interval determining unit is further for determining one of a left boundary and a right boundary of the first interval, and when the first interval is the longer interval, the transition point relates to the left boundary and the right boundary of the first interval.

16. The apparatus according to claim 15, wherein when the transition point is at the first position, the transition point is at the right boundary of the first interval, and when the transition point is at the second position, the transition point is at a previous position of the left boundary of the first interval.

17. The apparatus according to claim 10, wherein the first interval is generated cyclically.

18. The apparatus according to claim 17, wherein a boundary of the first interval is generated by N modulus calculation of another boundary of the first interval and the interval length.

19. The apparatus according to claim 10, wherein the determining apparatus is applied to a decoder.

* * * * *